United States Patent [19]

Horst

[11] Patent Number: 5,090,534

[45] Date of Patent: Feb. 25, 1992

[54] SPACING RING FOR SPACING THE PLATES OF A VISCOUS COUPLING

[75] Inventor: Joachim Horst, Lohmar, Fed. Rep. of Germany

[73] Assignee: Viscodrive GmbH, Lohmar, Fed. Rep. of Germany

[21] Appl. No.: 570,292

[22] Filed: Aug. 20, 1990

[30] Foreign Application Priority Data

Aug. 22, 1989 [DE] Fed. Rep. of Germany ....... 3927587
Sep. 1, 1989 [DE] Fed. Rep. of Germany ....... 3928975

[51] Int. Cl.$^5$ .............................................. F16D 35/00
[52] U.S. Cl. ................................. 192/58 B; 192/58 C; 192/70.2
[58] Field of Search ............... 192/58 B, 58 R, 70.2, 192/70.28, 58 C; 464/24; 403/DIG. 7

[56] References Cited

U.S. PATENT DOCUMENTS

| | | | |
|---|---|---|---|
| 3,245,508 | 4/1966 | Livezey | 192/70.2 X |
| 3,404,832 | 10/1968 | Sutaruk | 192/58 B X |
| 4,444,298 | 4/1984 | Stangroom | 192/58 B X |
| 4,548,306 | 10/1985 | Hartz | 192/70.28 |

FOREIGN PATENT DOCUMENTS 0127521 6/1987 Japan .................... 192/58 B

Primary Examiner—Rodney H. Bonck
Attorney, Agent, or Firm—Toren, McGeady & Associates

[57] ABSTRACT

The invention relates to spacing rings for spacing plates of a viscous coupling, which spacing rings are provided with teeth which correspond to the teeth non-rotatingly receiving the plates, so that during assembly the tooth gaps are filled. This measure simplifies assembly because the plates can be preassembled to form a kind of package.

7 Claims, 2 Drawing Sheets

SPACING RING FOR SPACING THE PLATES OF A VISCOUS COUPLING

BACKGROUND OF THE INVENTION

The invention relates to means for spacing the plates of a viscous coupling which as outer plates are provided with outer teeth and non-rotatingly engage corresponding inner teeth of a coupling housing and which as inner plates are provided with inner teeth and non-rotatingly engage corresponding outer teeth of an inner plate carrier. The spacing means holding the associated plates at a predetermined distance from one another.

Such viscous couplings, as they are known from DE 38 28 421 C1, for example, are used for instance in the drive assembly of a four wheel drive vehicle. The coupling housing is usually provided with inner teeth in which the outer plates are arranged so as to be non-rotating, with spacing rings formed of wire which is bent so as to be circular holding the outer plates at a distance from one another so that they are axially immovable. The inner teeth in the inner wall of the coupling housing are usually produced by broaching. The disadvantage of this design is that dead spaces occur between the individual outer plates in the inner teeth, radially outside the spacing rings. These dead spaces may cause problems when filling the interior of the coupling housing with a viscous medium.

Furthermore, such spacing rings cannot be fitted by automatic means because they have to be pretensioned in order to rest securely against the inner wall of the housing and not reach the operational range of the inner plates.

SUMMARY OF THE INVENTION

Accordingly, it is an object of the present invention to provide spacing means for spacing the plates of a viscous coupling, in the case of which there occur no dead spaces in the region between the plates and which, furthermore, permit automatic assembly.

Pursuant to this object, and others which will become apparent hereafter, one aspect of the present invention resides in providing the spacing rings with teeth which correspond to the teeth of the component holding them.

In this way it is possible to provide spacing means by means of which optionally the inner or outer plates may be spaced so that the tooth gaps between them are filled. Such spacing rings can very easily be produced to form plate packages with the plates associated with them, and they can be fitted easily.

In a preferred embodiment, the spacing rings are associated with the outer plates, and for weight saving reasons, it is advantageous to make the spacing rings of plastic, preferably glass fiber reinforced plastics.

To facilitate assembly, it is proposed to align the spacing rings at least partially by gluing points relative to the associated plates or to align the spacing rings by gluing points relative to the outer plates.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF PREFERRED EMBODIMENTS

Figure 1:
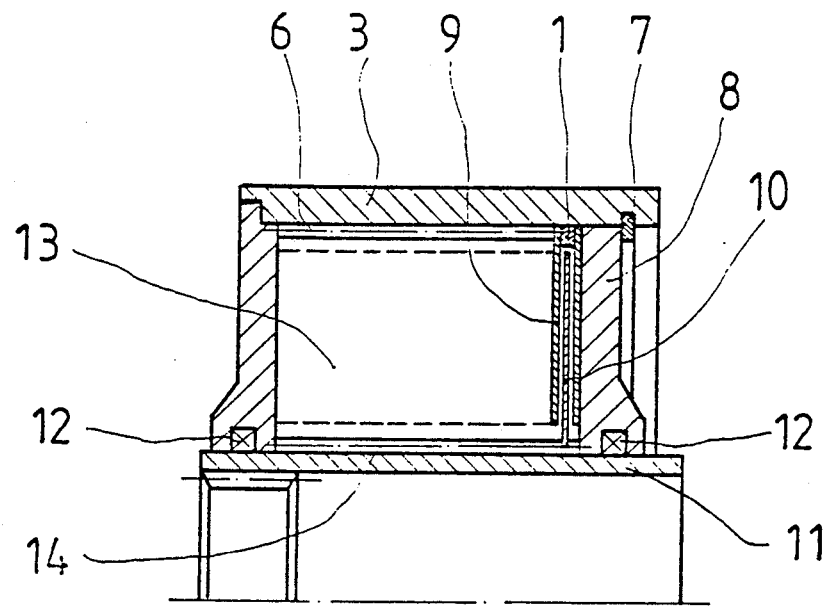
FIG. 1 is a longitudinal section through the coupling housing of a viscous coupling, comprising inner plates positioned on the plate carrier so as to be axially movable as well as outer plates spaced by inserted spacing rings.
Figure 2:
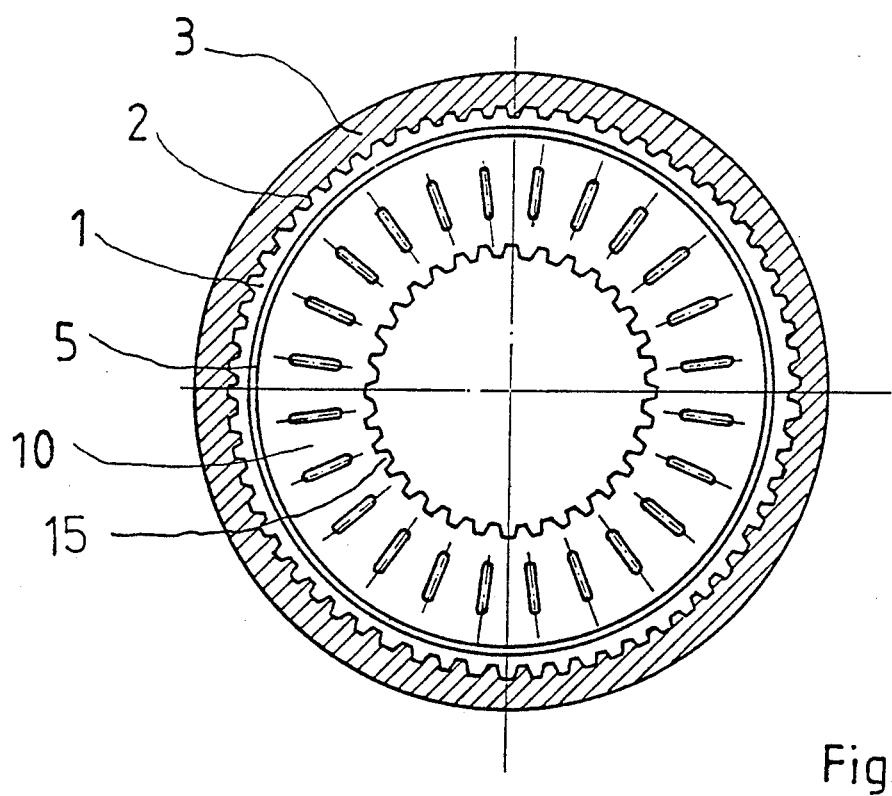
FIG. 2 is a cross-section through the coupling housing of a viscous coupling according to FIG. 1, comprising an inserted spacing ring.

The detail as illustrated refers to an inserted spacing ring 1 of a viscous coupling according to FIGS. 1 and 2 with double inner plates 10.

The viscous coupling as shown in FIG. 1 substantially consists of a coupling housing 3 which is rotatably arranged on an inner plate carrier 11, for instance a coupling hub and sealed relative thereto by seals 12. Toward the outside, the coupling housing 3 is closed by a cover 8 which is securely held in position by axial securing means 7. An inner housing wall 6 of the coupling housing 3 is provided with axially extending teeth non-rotatingly accommodating outer plates 9 with corresponding outer teeth, not illustrated in detail. The inner plate carrier 11 is provided with axially extending outer teeth 14 non-rotatingly, but axially movably accommodating inner plates 10 with inner teeth 15 illustrated in FIG. 2. The interior 13 of the coupling housing 3 is at least partially filled with a viscous medium.

Figure 4:
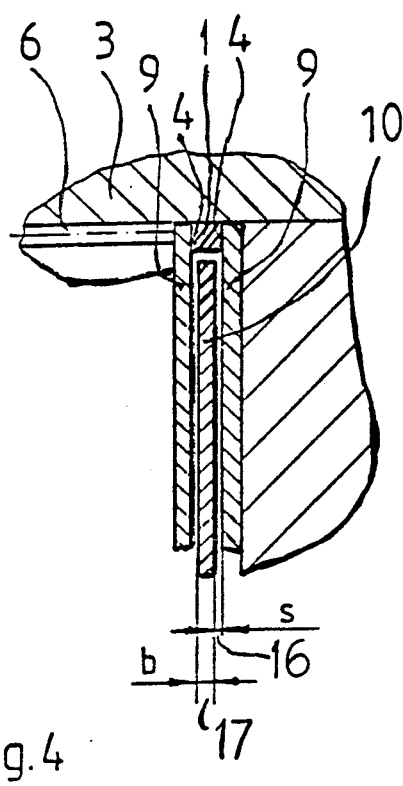
FIGS. 4 and 4a show an enlarged detail of a part of FIG. 1.
Figure 4A:
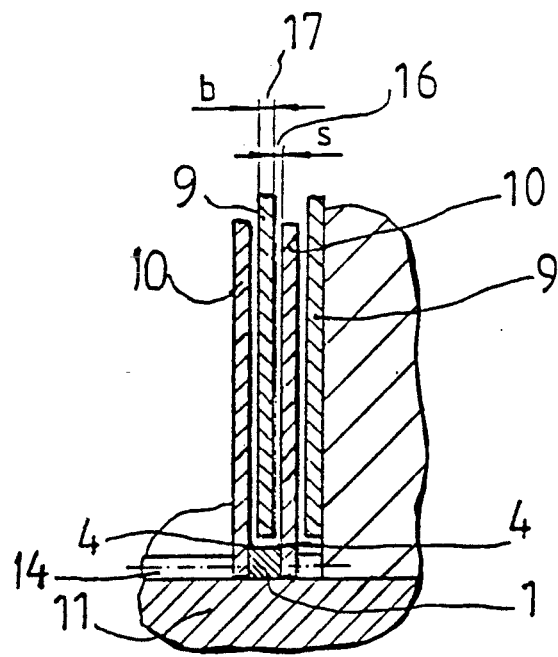

In the case of the embodiment shown, the outer plates 9 are held at a predetermined distance by spacing rings 1 in accordance with the invention. As can be seen in FIGS. 4 and 4a, this predetermined distance is determined by the gaps on either side of the inner plate 10 having the gap dimension 16 and the plate width 17. The gap dimension 16 ensures that the inner plate 10 is provided with a predetermined axial mobility between two outer plates 9.

Figure 3:
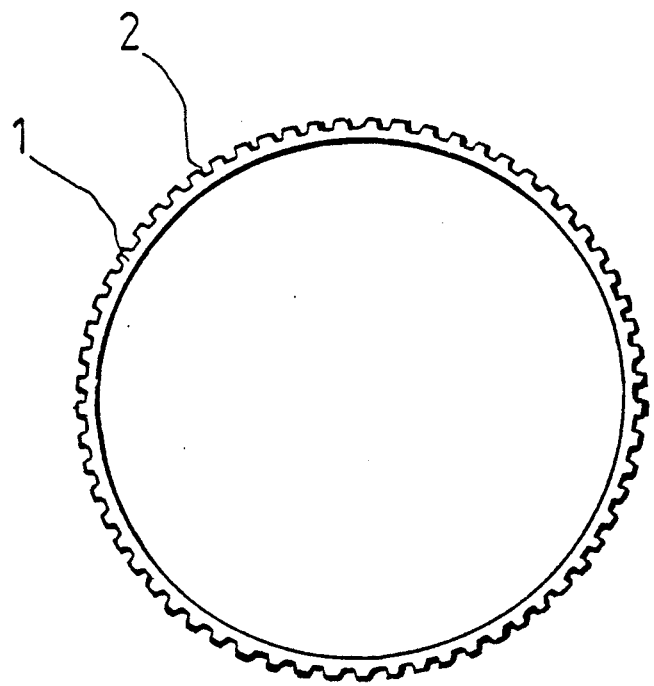
FIG. 3 is a plan view of a spacing ring in accordance with the invention for being incorporated into a viscous coupling according to FIGS. 1 and 2.

As further illustrated in FIG. 2, the inner plates 10 have an outer diameter 5 which is smaller than the inner diameter of the spacing rings 1, as shown in FIG. 3. These spacing rings 1 shown in FIG. 3 are provided with outer teeth 2 with which they may establish an operational connection with the inner teeth of the inner housing wall 6. These outer teeth 2 fill the space of the inner teeth between two outer plates 9, thereby avoiding dead spaces.

To facilitate assembly, the spacing rings 1 may be fixed on the outer plates 9 or the inner plates (10) by gluing points 4, as illustrated in FIGS. 4 and 4a.

The glue does not have to meet any special requirements regarding temperature resistance because the connection only has to last for the duration of the assembly process; thereafter it may be disconnected. The spacing rings 1 should preferably be made of glass fiber reinforced plastic which, should the plastic material soften due to temperature-related influences, continues to maintain the distance between the outer plates 9 because of the glass fiber matrix.

The embodiment as shown in FIG. 4a is provided with a spacing ring 1 of a greater axial extension so that two adjoining inner plates 10 may be movably arranged between two outer plates 9.

While the invention has been illustrated and described as embodied in a spacing ring for spacing the plates of a viscous coupling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A viscous coupling, comprising:
    a coupling housing (3) having axially extending inner teeth;
    a coupling hub (11) having axially extending outer teeth;
    a set of outer plates (9) provided with outer teeth which non-rotatingly engage the axially extending inner teeth of the coupling housing (3);
    a set of inner plates (10) provided with inner teeth which non-rotatingly engage the axially extending outer teeth (14) of the coupling hub (11), the plates of the inner and outer sets of plates being arranged in a given sequence; and
    spacing rings arranged between subsequent plates of one of said sets of inner and outer plates so as to provide gaps between the subsequent plates and thus fix the axial position of the subsequent plates, the plates of the other of said sets of plates being axially movable in the gaps between the spaced plates of the one set of plates, the spacing rings (1) having teeth (2) which fill tooth gaps of the teeth of one of the coupling housing (3) and the coupling hub (11), and the spacing rings (1) having a thickness which exceeds a thickness of the axially movable plates.

2. A viscous coupling according to claim 1, wherein the spacing rings (1) are provided with outer teeth (2) which engage the inner teeth of the coupling housing.

3. A viscous coupling according to claim 1, wherein the spacing rings (1) are provided with inner teeth (15) which engage the outer teeth of the coupling hub.

4. A viscous coupling according to claim 1, wherein the spacing rings (1) are made of plastic.

5. A viscous coupling according to claim 1, wherein the spacing rings (1) are made of glass fiber reinforced plastic.

6. A viscous coupling according to claim 1, wherein the spacing rings (1) are at least partially aligned by gluing points relative to the associated plates (9, 10) so as to facilitate assembly.

7. A viscous coupling according to claim 1, wherein the spacing rings (1) are aligned relative to the outer plates by gluing points so as to facilitate assembly.

* * * * *